United States Patent Office
3,120,612
Patented Feb. 4, 1964

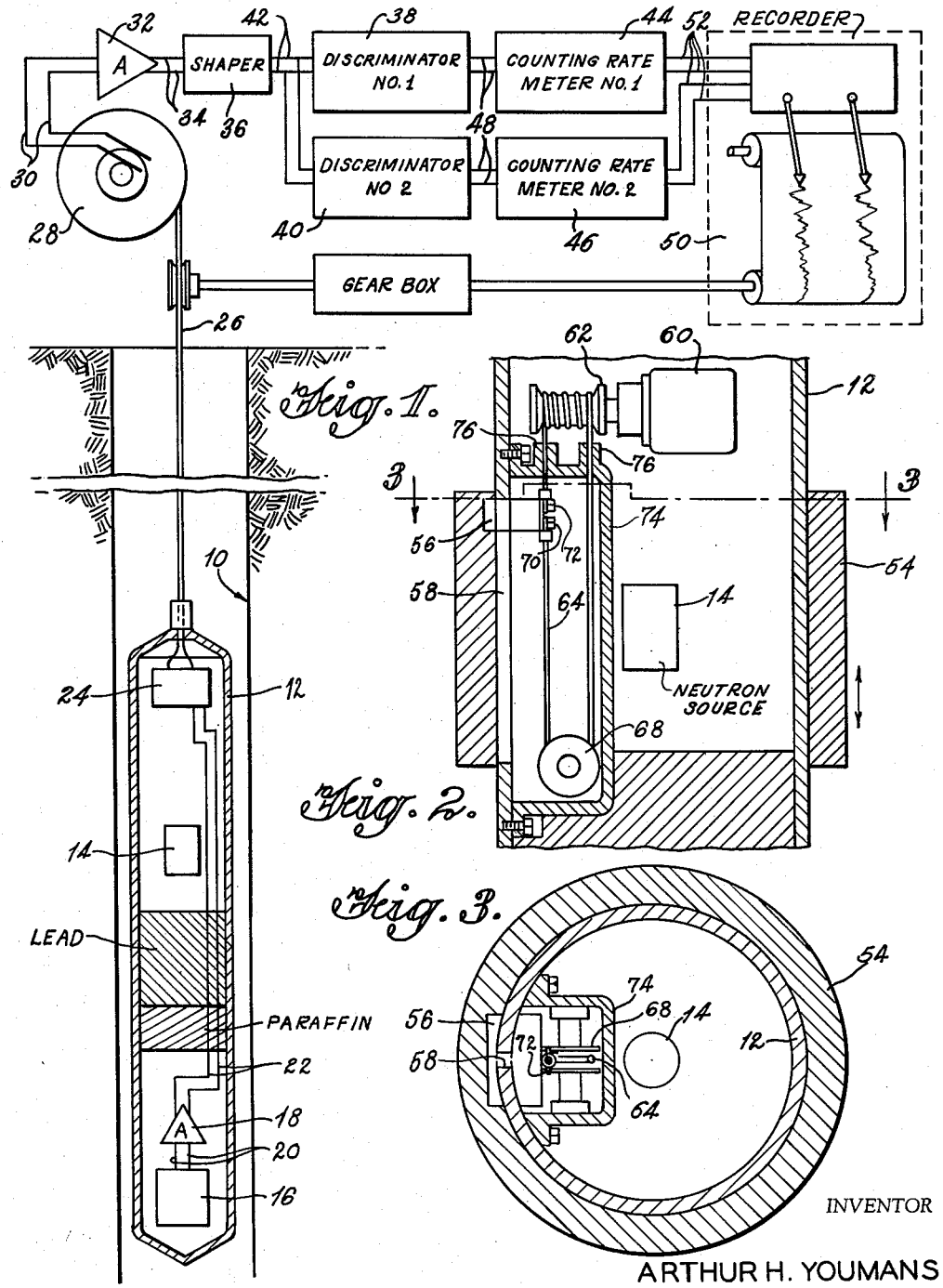

3,120,612
OXYGEN-SILICON LOGGING METHOD UTILIZING EQUAL INTENSITY BUT DIFFERENT ENERGY NEUTRONS
Arthur H. Youmans, Tulsa, Okla., assignor to Well Surveys, Inc., a corporation of Delaware
Filed Apr. 3, 1959, Ser. No. 803,912
5 Claims. (Cl. 250—83.3)

This invention relates to the art of geophysical prospecting for valuable mineral deposits by methods generally known as radioactivity well logging. More particularly, the invention is concerned with new methods and apparatus for radioactivity well logging whereby analytical curves may be prepared with respect to particular strata affording a more precise indication of the strata content, in order that operations looking to the production of oil may be undertaken with greater assurance of success.

The art of radioactivity well logging is at the present time well established as a means of examination of subsurface strata whereby it is possible with great exactitude to determine precise locations at which within a given well it most likely would be profitable to undertake oil recovery operations. Various methods are in use wherein there are produced graphic representations of underground strata. These representations are known as well logs or curves. In general, radioactivity well logging methods involve traversing a well bore throughout the depth of the well with instrumentation adapted to develop electrical signals based upon radiations which are emanating from the underground strata surrounding the well bore and the preparation of visible measurements therefrom, which are the well logs. These radiation measurements may take several forms, including, for example, measurements of natural radioactivity, measurements of radiant energy emitted under conditions of excitation, as, for example, the detection of gamma radiation resulting from neutron bombardment, and the measurement of neutrons scattered within the formation and returned to the well bore as a result of neutron bombardment of the formation. Valuable information is obtained concerning the nature of the various strata traversed by the well logging instrument from these measurements.

Another form of strata study according to radioactivity well logging methods is known as activation logging. In this form of logging, radiations resulting from the decay of artificially produced isotopes are detected and recorded as an indication of the content of the surrounding strata. Activation logs may be prepared concurrently with the making of the more widely known conventional neutron log. Generally stated, in making these conventional logs the strata are bombarded by high-speed neutrons and the instantaneous excitation energy returned to the well bore in the form of gamma radiations may be recorded to produce a neutron-gamma ray log. Simultaneously with the production of this log, various unstable isotopes of the elements of the formation are produced which decay according to their characteristic half lives. In activation logging the radiation later emitted during decay of these isotopes is detected and measured as a function of depth in the borehole. This may be undertaken during the same well traverse that other neutron logs are being made, and in fact this is desirable since in order to obtain significant and reasonably complete information, the measurement must be undertaken promptly after irradiation, during the period when the isotopes are sufficiently active for recording under the conditions that are available.

Activation well logging is a valuble addition to the better known and older forms of well logging, such as neutron-neutron logging and neutron-gamma ray logging, in that it permits, in some respects, a more detailed analysis of the elemental content of the strata, from which it becomes possible with greater and greater conclusiveness to determine the exact level of an oil bearing formation, assuming, of course, that such exists in the area of the well bore.

Underground studies within well bores suffer from disadvantages due to space limitations. For example, in neutron logging, until relatively recently, about 8 or 10 mev. has been the maximum energy of the neutrons from sources suitable for use within the well bore, with the result that only these reactions having threshold values approximating this level or lower have been possible. Thus, activation logging, which measures induced radioactivity, has been able to provide only an indication of those elements which could be activated with these relatively low energy neutrons. However, a neutron source suitable for use within well bores and the equipment employed therein has recently been developed, providing considerably higher neutron energy levels than heretofore produced by, for example, radium-beryllium sources.

The new source, which is based upon the deuterium-tritium reaction, delivers neutrons of somewhat above 14 mev. With this new accelerator type source, it becomes possible to examine the strata with greater particularity. For example, the new neutron source provides neutrons of a velocity sufficient to activate oxygen, which has a reaction threshold of about 10 mev. Obviously, this is a very important accomplishment because oil contains no oxygen whereas water and ordinary rocks contain more oxygen by weight than any other element. Thus, by learning the ratio of oxygen to other materials, it becomes possible to deduce with far greater accuracy whether or not a particular formation is oil-bearing and, if so, the most desirable level within the oil-bearing stratum to undertake recovery operations.

Because the accelerator type source may have a greater neutron output than is feasible with ordinary sources it is capable of producing measurable activation in many other elements. Some of these, while they do not require extremely energetic neutrons, occur in relatively smaller abundance and emit less energetic decay radiation. Moreover, the half life of the decay of these other materials is less favorable for detection in a logging operation, being too long to permit the decay to occur during the short period available for measurement. Among the elements which it is particularly desirable to detect are silicon, aluminum, magnesium, iron, chlorine and sodium. For each of these elements there exists a threshold energy level which is the lowest neutron energy capable of producing the activation reaction. All of the above elements have threshold values intermediate between zero and that for oxygen at about 10 mev. Of the group, the second highest is silicon at about 4 mev. while the lowest is aluminum which can react with neutrons of thermal energy or lower. Most of these elements can react with neutrons in more than one way, as, for example, by neutron-proton (n, p), or neutron-alpha (n, α) reactions. In the case of aluminum even thermal neutron capture produces activation. Since more than one isotope may be produced by each of several constituent elements in some formations, it will be appreciated that the radiation spectrum produced may be very complex. In cases where several elements contribute to the activation it is therefore very difficult to determine in a logging operation which elements are present and what their relative abundance is.

It is, of course, desired to determine the actual absolute abundance of each detectable element at each point in the borehole. It will be seen, however, that only the relative amount of each to the others or of each to one of the others is necessary to achieve an adequate indication of lithologic and petrophysical properties of the strata.

Thus, in addition to a measurement of the oxygen to silicon ratio it is frequently desirable to measure the silicon to aluminum ratio, the magnesium to oxygen ratio, etc.

It is found that, in employing a deuterium-tritium source with activation logging performed by means normally utilized, e.g. at a speed of about 20 feet per minute, the induced radioactivity due to oxygen activation tends to obscure other activities. It is therefore impossible to determine accurately from such a log the presence or absence of other important elements and their relative abundance in comparison to oxygen. It is oftentimes of importance to establish the ratio of oxygen to other of the elements which may be activated within the rock, as, for example, when certain portions of a formation are known to be gas-filled while an underlying area is water- or liquid-filled. An instance of this may be encountered in the running of a conventional neutron log, from which it is ordinarily possible to differentiate a gas-filled zone from a liquid-filled zone. In such a case, as the instrument passes from the liquid-filled zone into the gas-filled zone, and assuming that the instrument is being hoisted in the well bore under the usual well logging conditions, a sudden increase in the log deflection occurs, and this is interpreted to indicate that a gas-bearing zone has been responsible. From experience, a tentative conclusion is reached that oil may be present in the area which is indicated by the lower deflection of the log to be liquid-bearing, oil often being found immediately beneath a gas-filled zone or immediately above a water-filled zone. It is not in general possible to determine from a neutron log whether the indicated liquid-bearing zone is solely oil- or solely water-bearing or whether it is partly one and partly the other. It is, however, highly desirable to be able to select the most advantageous point of operation in the liquid-bearing zone if it is finally decided that it should be worked. For example, in a cased well, one must know the precise level at which a perforating operation should be undertaken; otherwise, one may perforate the gas-filled zone or, if the liquid-filled zone is composed of two zones, one water and one oil, the water-filled zone may be perforated instead of the oil-filled zone.

Obviously, a log which will permit accurate evaluation of formation fluid content would be most advantageous in attempting to maintain an operation which is attractive from the cost standpoint. Other examples of occasions when it will be of interest to determine the ratio of oxygen to other elements within the formation will occur to those skilled in the art; however, inasmuch as the problem which has just been described provides an excellent basis for illustrating the present invention, reference will be made to it again at a later point herein.

As indicated above, no activation logging method has been known to the prior art which will permit an accurate indication of the relative amount of oxygen and silicon or other elements contained in the liquid-bearing strata. It will be apparent, that if, in the total liquid-filled zone, a portion thereof is found to contain a considerably higher ratio of oxygen to silicon than another overlying portion, a sensible deduction would be that the lower liquid-bearing zone would, in all probability, be water-bearing and that the overlying zone, reflecting a far lesser ratio of oxygen to silicon would, in view of other experiences and the fact that oil contains little oxygen, in all probability be oil bearing. Therefore, the desirability of such a measurement in activation logging is rendered clearly apparent. On the other hand, a finding of a relatively large ratio of aluminum to silicon in a particular portion of the formation would indicate that in that region the formation is cemented with clay minerals or shale, reducing its permeability and porosity relative to other parts of the formation.

By running the activation log at a much lower speed than 20 feet per minute, or by increasing the detector to source spacing, so as to allow oxygen activation to die out before the detector reaches the irradiated zone, silicon, aluminum and other elements may be observed. However, as those skilled in the art will appreciate, logging at low speeds is for various reasons undesirable, even when time is available. Moreover, this technique does not lend itself to the measurement of the ratios referred to in the foregoing.

It is to this problem of determination of relative abundance of elements by activation well logging methods, whereby to bring about a more precise understanding of subsurface formations, that this invention is directed. The invention is directed both to methods and apparatus for mineral prospecting, especially well logging.

While, as has been indicated above, the invention is concerned with ratio determinations of various elements it will be apparent that the information provided by the methods and apparatus of the invention is intrinsically valuable for use as may be desired and that such information need not necessarily be employed according to any mathematical process; therefore, it is to be understood that the invention is not restricted to element ratio determination and that the invention extends to the broader concept of providing a quantitative indication of each element which can be made radioactive by high-speed neutron bombardment.

The object of this invention is to attain determinations respecting element content, and especially the relative abundance of elements present within particular strata. One application of the method envisions the preparation of a log indicative of the total activation, i.e., induced radioactivity, of the elements of the strata and, simultaneously therewith, the preparation of a log indicative of the induced activation with respect to the element having the highest threshold value. The former of these two logs is, of course, made by measuring with an energy sensitive detector all radiations arising as a result of the decay of the artificially produced isotopes which produce pulses above a given minimum voltage, for example, pulses having an amplitude indicative of 100 kev. gamma ray energy, while the latter is made by measuring only that radiation due to the induced activity from the element having the highest reaction threshold. Having prepared these two logs, the invention contemplates (as exemplary, but especially suitably) the application of a neutron moderating device about the neutron source thereby reducing the energy of the neutrons being delivered by the source to a value preferably below that of the highest threshold value, and then proceeding to make still another log in the same manner except with the neutron moderator in place, this log covering the same area of the bore hole as did the other log. This latter log, of course, measures largely the induced radioactivity of the elements of lower reaction threshold that are involved in the desired determination, since the neutrons incident upon the formation are now below the uppermost threshold. The invention then envisions the making of a comparison of these logs and from this comparison, proceeding to make the determination of the desired ratio.

Also, the invention envisions the use of two neutron sources, one supplying neutrons of an energy sufficient to activate a high threshold element desired to be investigated and another neutron source supplying neutrons of a lower energy, i.e., at least below the threshold of the element involved in the ratio determination having the higher threshold value, whereby to accomplish the preparation of the series of logs that are in the previous embodiment prepared by the use of a moderated and an unmoderated source.

In its most general application the invention envisions the method of formation analysis applicable wherever two or more elements contribute to the decay radiation observed in the performance of an activation log by whatever technique and with whatever instrumentation may be desired. The method consists in successively performing the chosen logging operation over the same portions of the well, every detail of the respective operations permissably being the same and every element of the instrumentation permissably being the same insofar as possible except for the difference that for each respective operation a different neutron energy spectrum irradiates the formation, the differences in spectra being attained either by variations in shielding or moderating material around the source or by substituting successive sources of inherently different emission characteristics. Having thus measured the activation induced by each of two or more different neutron spectra, a ratio of each of the resulting logs to each other log is taken, variations in said ratios being indicative of variations in the relative amounts of the activated elements, the elements of highest threshold contributing relatively less to activation induced by relatively lower energy neutron sources. The invention envisions that as many logs as desired may be made, each dependent upon the neutron spectrum and differing from logs made with different neutron spectra.

In view of the particular importance of a log indicating the ratio of oxygen to silicon, the invention is especially concerned with methods whereby this ratio may simply and accurately be established.

According to the invention, any practicable high energy neutron source may be employed provided it affords neutrons of sufficient energy for the purposes of the invention. As indicated hereinabove, neutrons delivered from a source employing the deuterium-tritium reaction are especially suitable. This reaction is well understood and its manner of accomplishment is known; however, for a more complete understanding of this neutron source, reference is made to United States Patent Number 2,689,918, issued to Arthur H. Youmans, September 21, 1954.

In order to moderate this high energy neutron source to permit logs to be prepared which will reflect, for example, only silicon activation and other elemental activations which are produced by neutrons capable of activating silicon, a moderating shield of a material having a high n-2n or n-n gamma cross section is arranged to be moved into position to intercept the direction of flow of neutrons into the formation. Preferably, a material is employed which has a high cross section for the former of the two mentioned reactions whereby the number of neutrons reaching the formation will be diminished as little as possible or even increased. Many materials are suitable for this purpose and the invention envisions that materials such as plutonium, uranium, lead, tungsten, bismuth, copper, and other high atomic weight materials may be employed as desired according to the purposes sought to be accomplished. So as to avoid the necessity of removing the instrument from the well bore on each occasion that it becomes necessary to alter the position of the moderator, it is desirable, as suggested above, that this shield or moderator material be mounted in association with the well logging instrument in a fashion which will permit it to be alternately moved into and out of position by control means located outside the well bore.

With the foregoing discussion of the invention in mind, and in view of the fact that radioactivity well logging is now well understood, it is believed that those skilled in the art will perceive various manners and means by which the invention may be carried into effect. In general, the invention contemplates the use of components and assemblies that are well known. Drawings are appended hereto wherein there is indicated in schematic form, well logging instrumentation (together with suitable legends) by which the objects of the invention may be achieved. In the drawings, FIG. 1 is a schematic showing of well logging instrumentation revealing the general association of component parts desirable for use in carrying this invention into effect. FIG. 2 of the drawings illustrates apparatus suitable for providing neutron fluxes of two different energy characteristics from the same neutron source. FIG. 3 is a transverse sectional view taken on the line 3—3 of FIG. 2.

Referring to the drawings, numeral 10 denotes a well bore and the surounding formation. Within the well bore 10 is illustrated a well logging instrument having an outer housing denoted by numeral 12. Within the housing 12, is contained a neutron source 14 of the deuterium-tritium type, a moderator for which according to the purposes of this invention is illustrated in FIG. 2 of the drawings. Suitably spaced from the source of neutrons is a radiation detector 16 which may be of any suitable type efficient in the detection of gamma radiation, for example, a scintillation detector, such as a thallium-activated sodium iodide crystal. Numeral 18 denotes an amplifier of a type conventional in well logging instruments to which the output signal of the detector is delivered by way of wiring 20. Numeral 24 denotes an impedance matching device which receives the output of amplifier 18 by way of wiring 22 and delivers the signal to cable 26 for transmission above ground.

Cable 26 is stored on reel or drum 28 and the signal is taken by wiring 30 from the cable in a well-known manner for delivery to amplifier 32. The output of amplifier 32 passes over wiring 34 through pulse shaper 36, and thence to discriminators, numbered 1 and 2, denoted by numerals 38 and 40, respectively. In the design and operation of the various circuit elements, particularly amplifiers 18 and 32 and pulse shaper 36, it is essential that the pulse spectrum produced by detector 16 be amplified and transmitted to discriminators 38 and 40 without significant change in the relative amplitudes of individual pulses. Numerals 44 and 46 denote counting rate meters 1 and 2 and, finally, numeral 50 denotes a plural trace recorder. The electrical signal, after leaving the cable, is passed to the various above-ground instruments by way of wiring indicated at numerals 30, 34, 42, 48, and 52.

The function of the several above-ground instruments is well known, however, as concerns this invention, it may be stated that discriminator number 1 (numeral 38) is set to pass the entire range of voltage pulses indicative of gamma ray energy above a selected minimum level, e.g., 80 kev., whereas discriminator number 2 (numeral 40) passes only voltage pulses above a selected higher threshold, such as 2–3 mev. Thus, an output signal is produced that is representative of substantially the entirety of the detected radiations by discriminator number 1 for delivery to counting rate meter number 1 which signal is employed to prepare a corresponding curve, and the output signal from discriminator number 2, delivered to the recorder through counting rate meter number 2, is employed to produce a curve of the higher energy component of the activation, for example, that due to oxygen. As will be understood, the counting rate meters function to produce outputs which are directly proportional to the frequency of occurrence of voltage pulses which exceed the selected threshold of their associated discriminators.

Refering now to FIG. 2, numeral 54 denotes a cylindrical moderator which when in place embraces the entire circumference of housing 12. As indicated above, moderator 54 may be of various materials, lead being chosen in this instance. Suitably attached to moderator 54 is a bracket 56. Bracket 56 extends from the moderator to a point within housing 12, passing through elongated slot 58 in the said housing. Moderator 54 is vertically movably associated with the housing, the extent of movement being determined by the length of a slot 58 through which bracket 56 extends. To facilitate such movement, the moderator may be mounted on roller bearings, easily fixed therein but not illustrated in the drawings.

In order to effect movement of the moderator about the neutron source, a reversible motor and reel-pulley assembly is provided. Numeral 60 denotes a motor, attached to housing 12, to which power to actuate may be supplied from a remote above-ground station by way of cable 26. Numeral 62 denotes a reel mounted on the shaft of motor 60. The motor-reel assembly is operatively associated with the moderator by means of a fixed length cable 64. Numeral 68 denotes a pulley, the purpose for which will be shown presently, securely attached to housing 12. As can be seen from the drawings, a portion of cable 64 is wound upon reel 62. Both ends of cable 64 depend from the reel 62, one end first being threaded through pulley 68 and then fixed to bracket 56, as at numeral 70. The opposite end of cable 64 is fixed directly to bracket 56, as at numeral 72.

Because of slot 58, which is through the outer housing wall 12, and, thus, through which slot well fluids would pass when the instrument is in use in a well, means are provided to seal off the pulley-bracket-cable assembly from the remainder of the instrument interior. This means is denoted by numeral 74 and constitutes an elongated trough enclosing the area extending from just above the bracket 56 to just below pulley 68; laterally, trough 74 extends just sufficiently to allow unimpeded movement of cable 64. At the upper end of trough 74, passageways 76 are provided permitting reception of cable 64 into the interior of the trough. Passageways 76 are provided with bushings (not illustrated) forming a fluid seal with cable 64 and the entire trough is affixed to housing 12 in a suitable manner (not illustrated in detail) and, similarly, with a fluid-tight seal. Accordingly, while well fluids may enter the interior of trough 74 through slot 58, they cannot escape into the main interior of housing 12.

It will be understood that the moderator is moved into position around source 14 and away from that position by action of motor 60. Assuming that it is desired to move the moderator downwardly away from the source, motor 60 is actuated so as to take in that portion of cable 64 which is attached by way of pulley 68 to point 70 on the bracket 56. This movement, of course, pays out cable from the opposite end, and, in so doing, the bracket is drawn downwardly to the bottom end of slot 58 carrying with it the moderator. At this point motor 60 is de-energized, in any suitable manner known to the art. Obviously, the moderator is returned to the position surrounding the source by opposite rotation of reel 62.

It will be appreciated that within the invention moderator 54 may be associated with the housing for movement about the source in any suitable manner, the manner illustrated and described being only exemplary of one suitable for practicing the invention herein. For example, by employing a suitably large pressure housing 12, the moderator 54 may be placed inside.

Various modes of and occasions for practicing the invention will occur to those skilled in the art; and, thus, further discussion is not thought to be necessary. By way of example, however, and in the fullness of illustration, it is desired to describe an instance permitting valuable information to be obtained with the teachings herein.

Let it be assumed that from other logs it is established that a thickness of subsurface formation is sandstone and that a portion thereof is gas filled and the remaining underlying portion is liquid bearing. From experience, it is concluded that oil may be contained in the liquid thickness and it is desired to test the speculation. A plural trace activation log is then prepared of the entire selected sandstone strata with the moderator moved downwardly away from the source, whereby two curves are afforded, one of oxygen plus silicon plus other long-lived low energy level activation above about 100 kev.; and one of oxygen exclusively. This is accomplished by supplying the output from pulse shaper 36 to the two discriminators, one being set to pass all pulses above about 100 kev. and the other being set to pass pulses above about 2 mev.

With moderator 54 in position surrounding source 14, a large proportion of the neutrons will have their energy reduced to a value below the oxygen activation threshold. A further log of the same sandstone strata is then prepared in a manner entirely similar to that employed in preparing the first log. In contrast to the first log, the latter log is relatively free of oxygen activation and is substantially more indicative of other elements, particularly silicon and aluminum. Thus, upon comparison, the two logs are found to differ in that the ratio of indicated oxygen activation to indicated silicon activation is less in the instance where the moderator surrounded the source. Then, by more complete analysis of the curves, it is found that within the upper and lower levels of the liquid-bearing zone, there is a portion shown by the logs to contain oxygen in much higher ratio to silicon than a portion immediately above. The conclusion to be drawn from this observation is that the overall liquid bearing zone is composed of two different liquid-bearing strata, the lower stratum reflecting the higher oxygen to silicon ratio containing water, the oxygen of which adds to that contained in the sandstone in the logs, and the upper stratum containing oil, containing no oxygen, and thus accounting for the lower ratio of oxygen to silicon.

Had a neutron source of maximum energy less than 10 mev. been chosen for the first logging operation, or had the logging speed been chosen sufficiently slow, oxygen activation would have been unobserved by the detector and the two successive logs would have been primarily distinguished by a difference in the silicon to aluminum ratio and/or by variations in the relative contribution of any other participating element. Although these variations occur also in the case first described, the variations in oxygen and silicon activation respectively, tend to obscure other variations except when the abundance of the other elements is relatively great. Thus, for example if it is the particular objective to determine the relative abundance of silicon and aluminum respectively in the formation of the previous example the procedure would be as follows. First produce an activation log employing, if desired, the same accelerator source as previously employed, but arranging the activation detector at a distance of, for example, about 6 feet or more below the soucre and traversing the borehole at a speed preferably no greater than about 5 feet per minute. This arrangement assures that no significant amount of activation radiation due to oxygen will be observed. This first log may be regarded as a reference measurement, with which a second log is to be compared. This second log is then made employing the same logging speed and the same detecting apparatus but with the flux from the neutron source moderated in a manner similar to that heretofore disclosed. The log so produced, when compared with the first log will reveal that in every part of the formation the observed amount of activation is reduced. However, the relative reduction from point to point in the formation will vary, depending upon the relative amount of silicon and aluminum therein. Thus, if a curve is formed by taking a ratio of the second log divided by the first log it will be observed that points of larger deflection on this ratio log will indicate points of relatively greater aluminum content. More particularly, variations in this ratio log indicate variations in formation characteristics relating to the amount of clay cementation of the formation. Thus, zones of relatively higher aluminum content may be presumed to have relatively lower permeability and porosity than other zones where the aluminum content is relatively less. Interpretation of other logs to determine relative abundance, e.g., those pertaining to iron, chlorine and magnesium, may be accomplished similarly.

As has been indicated earlier herein, usually activation logging is carried out concurrently with another form of logging, suitably, neutron-gamma or neutron-neutron logging; however, insofar as this invention is concerned, this fact is of no significance since, if desired, activation logs may be run independently of other logging operations. For an additional description of activation logging, reference may be had to United States Patent Number 2,303,688, issued to Robert Earl Fearon on December 1, 1942.

In the foregoing paragraphs, the invention herein has been described in terms of particular embodiments involving plural traces corresponding to two different discriminator settings each made with two different neutron energy levels. Those skilled in the art will appreciate that the invention has wider application than this. Thus, it is desired to state that more broadly expressed, the invention includes within its scope the preparation of a single indication representative of a particular element or a combination of elements, i.e., representative either as to the presence or absence of particular elements in a given formation and if present, their approximate concentration, then altering the irradiating neutron flux to a different energy spectrum and obtaining an indication affording further information with respect to some but not necessarily all of the elements. Of course, it matters not which log is first prepared. Accordingly, the invention envisions the utilization of a single source of high energy neutrons to provide information concerning a particular body of matter and then the moderation of that source and its further use to irradiate the same formation whereby to resolve problems of analysis thereof, the solution to which cannot be obtained from the data which are available from the use of the higher speed neutron source alone.

Information similar to that obtained in connection with the specific embodiment herein discussed, i.e., the oxygen to silicon ratio and the presence or absence of these and the approximate quantity if present, may be obtained with respect to elements such as aluminum, iron, barium, chlorine, etc. Accordingly, the invention is not limited as regard particular elements.

It will be understood that the method of the invention herein described and claimed is not to be limited to the use of the particularly mentioned neutron sources as it will be obvious that various types of sources of neutrons and combinations thereof are capable of performing the method. Thus, a deuterium-tritium (DT) source may be employed in conjunction with a moderated or shielded deuterium-tritium source, the shielding being adapted to effect reduced activation of certain elements to a considerable extent or even to the point of insignificant activation. Also, the deuterium-tritium source may be employed in conjunction with various capsule sources, both full energy level and moderated, such as radium-beryllium, actinium-beryllium, etc. Similarly capsule sources may be utilized to the exclusion of the deuterium-tritium source. The method may be practiced utilizing the combination of the alpha-beryllium and the gamma-beryllium source.

Those skilled in the art will understand that the running of the logs as herein specifically described may include the step of waiting a predetermined time period between the actual logging steps in order to permit radiations induced on one occasion to decrease in intensity, thereby further enhancing the indications that are obtained of particular elements. Also, it will be understood that a natural gamma ray log may be prepared of the formations under study in order that natural activity may be eliminated from the logs made pursuant to the herein disclosed methods.

Many modifications of the described invention will be perceived that are not specifically mentioned herein, and it is to be understood, therefore, that the invention is not limited to the illustrative embodiments herein presented and that the invention extends to such modifications as are within the skill of the art.

What is claimed is:

1. The method of well logging which comprises irradiating the substances surrounding a borehole with a first intensity of neutrons of substantially a first energy sufficient to interact with oxygen nuclei in a manner to produce characteristic decay gamma radiations, detecting a representative number of said decay gamma radiations produced by said oxygen nuclei and deriving a first electrical signal functionally related thereto in correlation with an indication of borehole depth, on another occasion irradiating said substances with a second intensity of neutrons of substantially a second energy less than said first energy but sufficient to interact with nuclei other than oxygen in a manner to produce characteristic gamma radiations, said second intensity being at least as great as said first intensity, detecting a representative number of said decay gamma radiations produced by said nuclei other than oxygen and deriving a second electrical signal functionally related thereto in correlation with an indication of borehole depth, and correlatively recording said first and second electrical signals.

2. The method of well logging which comprises irradiating the substances surrounding a borehole with a first intensity of neutrons of substantially a first energy sufficient to excite oxygen nuclei in a manner to produce characteristic decay gamma radiations, detecting a representative number of said decay gamma radiations produced by said oxygen nuclei and deriving a first electrical signal functionally related thereto in correlation with an indication of borehole depth, on another occasion irradiating said substances with a second intensity of neutrons of substantially a second energy sufficient to excite silicon nuclei in a manner to produce characteristic gamma radiations but insufficient to excite oxygen nuclei, said second intensity being at least as great as said first intensity, detecting a representative number of said decay gamma radiations produced by said excited silicon nuclei and deriving a second electrical signal functionally related thereto in correlation with an indication of borehole depth, and correlatively recording said first and second electrical signals.

3. The method of well logging which comprises irradiating the substances surrounding a borehole with a first intensity of neutrons of a first energy sufficient to excite oxygen nuclei to produce characteristic decay gamma radiations, detecting a representative number of decay gamma radiations emanating from said substances as a result of such irradiation by said neutrons of said first energy and deriving therefrom a first electrical signal indicative of the presence of decay gamma radiations produced by excited oxygen nuclei, on another occasion irradiating said substances with a second intensity of neutrons of a second lesser energy sufficient to excite nuclei other than oxygen nuclei to produce characteristic decay gamma radiations, said second intensity being at least as great as said first intensity, detecting a representative number of decay gamma radiations emanating from said substances as a result of such irradiation by said neutrons of said second energy and deriving therefrom a second electrical signal indicative of the presence of decay gamma radiations produced by said excited nuclei other than oxygen nuclei, and correlatively recording said signals together with an indication of borehole depth.

4. The method of well logging which comprises irradiating the substances surrounding a borehole with a first intensity of neutrons of a first energy sufficient to excite oxygen nuclei to produce characteristic decay gamma radiations, detecting a representative number of decay gamma radiations emanating from said substances as a result of such irradiation by said neutrons of said first energy and deriving therefrom a first electrical signal indicative of the presence of decay gamma radiations characteristic of oxygen nuclei so excited, on another occasion irradiating with neutrons of said first energy predetermined nuclei having a relatively high n-2n cross section in a manner to produce irradiation of said substances by neutrons of a second intensity at least as great as said first intensity and of a second energy sufficient to excite nuclei other than oxygen nuclei to produce characteristic decay gamma radiations, detecting a representative number of decay gamma radiations emanating from said substances as a result of said irradiation by said neutrons of said second energy and deriving therefrom a second electrical signal indicative of the presence of decay gamma radiations characteristic of nuclei in said substances so excited, and correlatively recording said signals together with an indication of borehole depth.

5. The method of well logging which comprises irradiating the substances surrounding a borehole with a first intensity of neutrons of a first energy sufficient to excite oxygen nuclei to produce characteristic decay gamma radiations, detecting a representative number of decay gamma radiations emanating from said substances as a result of such irradiation by said neutrons of said first energy and deriving therefrom a first electrical signal indicative of the presence of decay gamma radiations characteristic of oxygen nuclei so excited, on another occasion irradiating with neutrons of said first energy at a point in said borehole adjacent said substances nuclei having a relatively high n-2n cross section in a manner to produce a second irradiation of said substances by neutrons of a second intensity at least as great as said first intensity and of a second energy sufficient to excite silicon nuclei to produce characteristic decay gamma radiations but insufficient to excite oxygen nuclei, detecting a representative number of decay gamma radiations emanating from said substances as a result of such irradiation by said neutrons of said second energy and deriving therefrom a second electrical signal indicative of the presence of decay gamma radiations characteristic of silicon nuclei so excited, and correlatively recording said signals together with an indication of borehole depth.

References Cited in the file of this patent

UNITED STATES PATENTS

| | | |
|---|---|---|
| Re. 24,383 | McKay | Oct. 29, 1957 |
| 2,303,688 | Fearon | Dec. 1, 1942 |
| 2,332,873 | Silverman | Oct. 26, 1943 |
| 2,390,433 | Fearon | Dec. 4, 1945 |
| 2,463,733 | Abaugh | Mar. 8, 1949 |
| 2,522,522 | Krasnow | Sept. 19, 1950 |
| 2,769,096 | Frey | Oct. 30, 1956 |
| 2,867,728 | Pollock | Jan. 6, 1959 |
| 2,884,534 | Fearon et al. | Apr. 28, 1959 |
| 2,905,826 | Bonner et al. | Sept. 22, 1959 |
| 2,914,677 | Arnold | Nov. 24, 1959 |
| 2,948,810 | Caldwell et al. | Aug. 9, 1960 |
| 2,963,586 | Pickard | Dec. 6, 1960 |
| 2,965,757 | Martin et al. | Dec. 20, 1960 |
| 2,996,618 | Goodman et al. | Aug. 15, 1961 |
| 3,035,174 | Turner et al. | May 15, 1962 |

FOREIGN PATENTS

| | | |
|---|---|---|
| 215,287 | Australia | June 4, 1958 |
| 485,339 | Canada | July 29, 1952 |
| 724,441 | Great Britain | Feb. 23, 1955 |

OTHER REFERENCES

Caldwell: Nuclear Physics in Petroleum Exploration Research, World Petroleum, April 1956, pp. 59 to 63.